Aug. 8, 1939. L. DUFOUR 2,168,733

MOTOR CULTIVATING MACHINE

Filed Feb. 5, 1938 5 Sheets-Sheet 1

INVENTOR
LEON DUFOUR
BY D. P. Wolhaupter
ATTORNEY

Aug. 8, 1939. L. DUFOUR 2,168,733
MOTOR CULTIVATING MACHINE
Filed Feb. 5, 1938 5 Sheets-Sheet 3
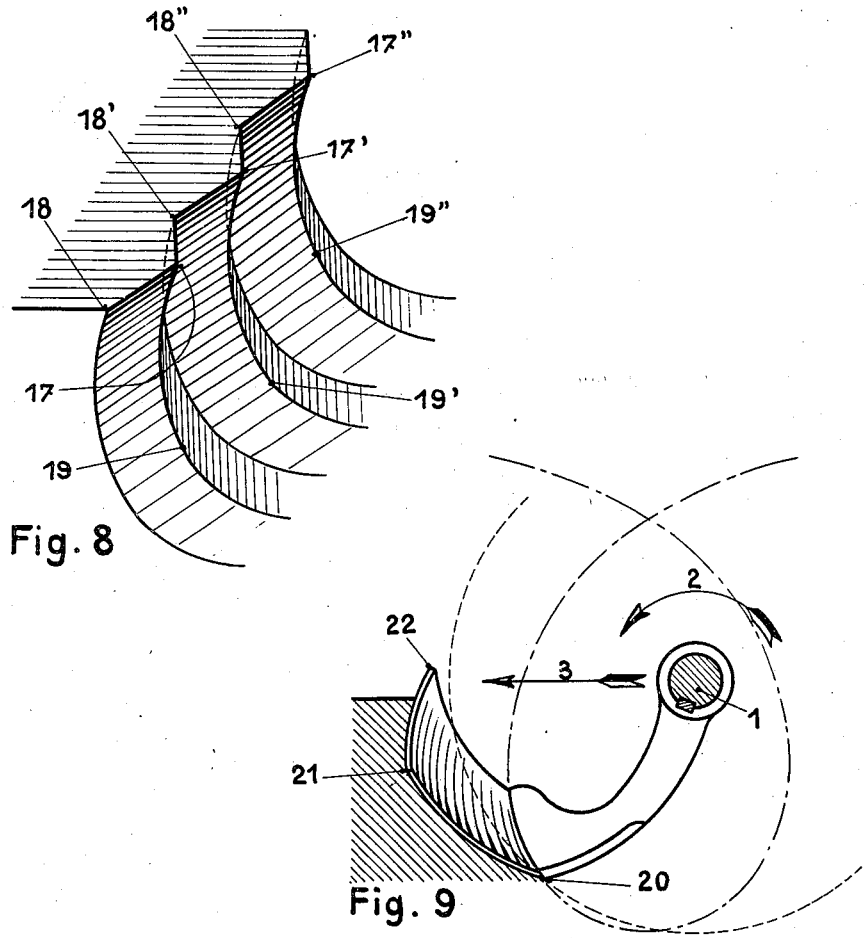
Fig. 8
Fig. 9
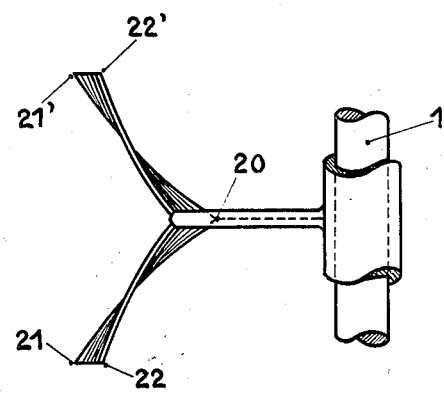
Fig. 10
INVENTOR
LEON DUFOUR
BY D. P. Wolhaupter
ATTORNEY Aug. 8, 1939. L. DUFOUR 2,168,733
MOTOR CULTIVATING MACHINE
Filed Feb. 5, 1938 5 Sheets-Sheet 4

INVENTOR
LEON DUFOUR
BY D. P. Wolhaupter
ATTORNEY

Aug. 8, 1939. L. DUFOUR 2,168,733
MOTOR CULTIVATING MACHINE
Filed Feb. 5, 1938 5 Sheets-Sheet 5

INVENTOR
LEON DUFOUR,
BY D. P. Wolhaupter
ATTORNEY

Patented Aug. 8, 1939

2,168,733

UNITED STATES PATENT OFFICE 2,168,733

MOTOR CULTIVATING MACHINE

Léon Dufour, Geneva, Switzerland

Application February 5, 1938, Serial No. 189,003
In Germany February 10, 1937

12 Claims. (Cl. 97—212)

The known motor cultivating machines, of which the horizontal shaft is arranged parallel to the axis of the driving wheels, are characterised by a rapid rotation of the tools relatively to the forward movement of the machine. The cutting edge or point of the tool which operates on the soil rotates at a peripheral speed which is 10 to 15 times greater than the linear forward movement of the machine. During this rapid rotation each tool only moves forwardly a few centimetres, for example 3 to 5, relatively to the preceding tool. Each tool acts more by its impact action against the earth than by its cutting action and it only tears a narrow strip of soil from the solid earth, which strip is rather broken up than cut up. This is the reason why in connection with motor cultivating machines having a rapid rotation, there can only be used as tools simple hooks formed of steel wire or sheet metal strips bent at right angles at their operative end. The disadvantage of these known cultivating machines resides in the fact that the soil is frequently sub-divided much too finely in consequence of the speed of rotation of the tool, whilst the tools, in spite of being secured resiliently or with the interposition of a safety friction clutch, wear very rapidly and even break.

The subject of the present invention is a tool for motor cultivating machines having a comparatively slow speed of rotation relatively to the forward movement of the machine. This tool is characterised by its novel shape which is most suitable for this slow speed of rotation and enables them to be easily constructed. By reason of this particular shaping the peripheral speed of the tool can be reduced until it is only 2 to 5 times greater than the linear forward movement. This arrangement has the advantage of permitting of a rapid linear forward movement, whilst the absolute speed of the tool remains lower than in the case of known cultivating machines. By reason of the lower speed of rotation of the tools the soil is broken up into coarser parts, which is desirable in many cases and the wear or breakage of the tools is less. The tool no longer operates upon the soil by dynamic impact, but only cuts it and mixes the parts together. This is a reason for which a new shape must be imparted to the tool.

According to the present invention each tool mainly consists of a cut, forged or pressed piece of steel of general triangular, spear point or goose-foot-like shape, which in consequence of the rotary movement of the tool penetrates with its point into the soil and then spreads the cut section to the left and right through the two sides or wings of the triangle. The cutting out of the coherent sod takes place in this manner in an entirely gradual increasing manner.

In order that the penetration of the tool into the soil takes place with the minimum consumption of power, the rear part of the cutting blade must describe exactly the same path as the cutting edge. For this purpose the two sides of the triangle have the shape of a curved or twisted surface, on both sides of the apex of the triangle, whilst the construction of this surface is such that each cut which is made at right angles to the axis of rotation of the tool, through the tool, has as surface the shape of an extended cycloid, which is produced in this same plane from the point of attack or from the abutting edge of the tool. The radius of curvature of this cycloid varies according to the point under consideration. For the shape of the blade of the tool, there is selected a particular point of the cycloid, which is more suitable than the others, for example the point at which the downwardly moving cycloid is located at 10 to 15 cm. below the surface of the soil. It is essential that for the period of time of the penetration into the first hard, dry and stamped soil layer, the tool has a shape suitable for a minimum consumption of power.

According to the invention the tool may also be constructed of two symmetrical parts integral with their support. By this arrangement it is possible in a simple manner to produce tools capable of resisting considerable force, whilst at the same time considerable economies are effected in operation by reason of the fact that when one part of the tool is damaged, it is not necessary to replace the entire tool. Provision is thus made for disposing the tool halves side to side or to arrange them relatively displaced on a hub.

The accompanying drawings show diagrammatically and by way of example a few forms of construction of the subject of the invention and the method of operation thereof.

In these drawings

Fig. 8 is a perspective view of the soil which is still solid after the passage of the cultivating tool.

Fig. 9 shows a modified form of Fig. 1, in which the attacking edge or cutting edge of the tool engages with the soil at a distance which increases from the apex of the triangle to the ends of the sides thereof.

Fig. 10 is a plan of the tool in Fig. 9.

In all these figures, 1 is the horizontal shaft of the tool arranged parallel to the shaft of the driving wheels. The arrow 2 indicates the direction of rotation of this shaft and the arrow 3 the linear direction of movement of the machine at right angles to the shaft 1.

Figure 1:
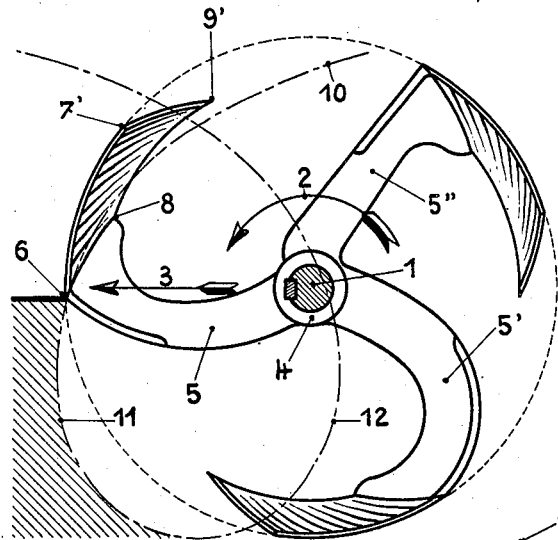
Fig. 1 is a cross-section of the shaft of a motor cultivating machine with tools, constructed in accordance with the invention, operating to the full depth.
Figure 2:
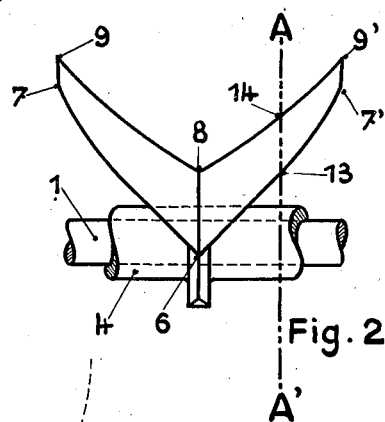
Fig. 2 is a front elevation of a tool.

In Figs. 1 to 5 a hub 4, provided with three projections is driven by the shaft 1. To each projection is secured an arm 5, 5', 5" connecting the shaft to the actual tool. The tool, of which the shape is best seen in Fig. 2, consists of a steel member cut out or pressed in the form of a triangle or spear point, with an apex 6, cutting edges 6, 7 and 6, 7' which extend symmetrically to both sides of the apex 6 and three rear corners 8, 9 and 9' arranged in the form of a triangle and which correspond with the three front corners 6, 7 and 7'. It will be readily understood that the shaft 1 in question of the motor cultivating machine is usually provided with a plurality of similar groups of tools distributed over the entire length thereof and relatively displaced in a suitable manner.

In Fig. 1 the curve shown in broken lines is the extended cycloid described by the point 6 of the tool when the shaft 1 rotates and the cultivating machine moves forwards at the prescribed speed. From Fig. 1 it will be seen that the middle edge 6—8 of the left hand tool secured to the arm 5 does not coincide with the cycloid passing through the attacking point 6. When it is assumed that this middle edge 6—8 constitutes a section through the tool at right angles to the shaft 1, this section, in accordance with the invention, must coincide with the cycloid described by the point 6, but only at a predetermined point of this cycloid, for example after penetrating into the soil from 10–15 cm., that is to say at the point indicated in Fig. 1 by 11. When the tool in question rotates in the direction of the arrow 2, whilst at the same time the shaft 1 moves forwardly along the prescribed path in the direction of the arrow 3, it will be seen that the edge 6—8 coincides exactly with the cycloid 10, 11, 12 but about 12 cm. below the surface of the soil at the point 11 in Fig. 1.

In Fig. 2 the plane AA' at right angles to the shaft 1 intersects the tool at the point 13, 14.

Figure 3:
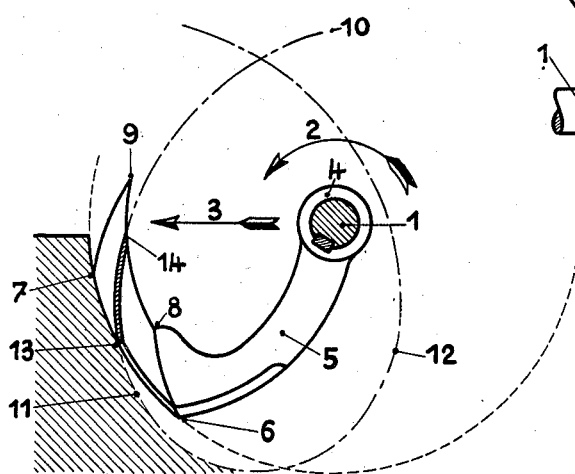
Fig. 3 is a cross-section of a tool on the line A—A' of Fig. 2 during operation.

Fig. 3 shows a side elevation of the cutting tool at the cutting point through the plane AA'. From this it will be seen that the cutting surface through the tool from 13 to 14 coincides exactly with the extended cycloid which is prescribed by the point 13 about 12 cm. below the surface of the soil at the point 11. The same will be the case a moment later for the outer edge 7—9 of the tool relatively to the cycloid described by the point 7.

From the foregoing it will be seen that the tool blade must be twisted so that its succeeding cross-sectional surfaces possess the desired cycloid shape. In practice however, for simplifying the manufacture, it will be sufficient to curve the blade in the form of an arc as this curvature coincides approximately with the arc of the selected cycloid or it is even provided with plain cross-sectional surfaces. The main object will always be that the cutting blade is so twisted that its arcuate or even plain cross-sectional surfaces coincide successively at least approximately with the arc of the cycloid at the point 11, to the same extent as the tool rotates with the prescribed speed ratio about the shaft 1 in the direction of the arrow 2 and advances linearly towards the left in the direction of the arrow 3.

Figure 4:
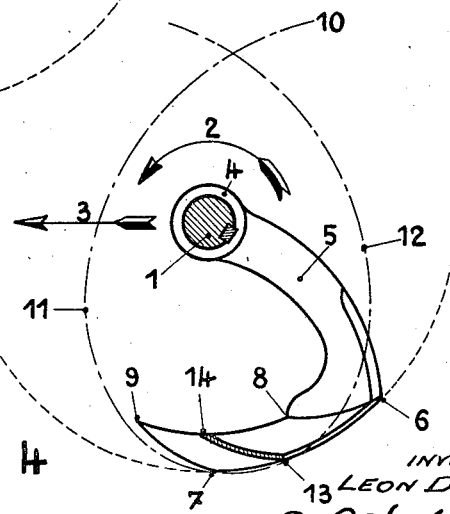
Fig. 4 is a similar cross-section of this tool along the same line A—A' of Fig. 2, but after it has been moved through about 90° relatively to the position shown in Fig. 3.

In Fig. 4 the tool under consideration and secured to the arm 5 has continued to move over by about 90° relatively to the position shown in Fig. 3. It will be seen that in this case the section 13—14 of the tool no longer coincides in any way with the cycloid described by the attacking point 13. In this case the point located at a depth of about 10 to 15 cm., where the tool section coincided with the cycloid of the attacking point, has already been passed some considerable time. The tool has here ended its work in cutting the soil and in this position it strikes with its hollow surface on a portion of the sod which has previously been cut off and breaks it up while at the same time partly turning it over. The result obtained by this new shape of the tool is that the triangular blade carries out with a minimum consumption of power, its penetrating and cutting operation during the first 10 to 15 cm. below the surface of the soil, that is to say at the point where this is the densest and presents the highest resistance, as every part of the blade located behind the cutting edge passes through the cut produced by this cutting edge. Only after this cutting operation has approximately been completed and when the tool comes to lie below the shaft thereof, will the tool cross-section no longer coincide with the cycloid described by the attacking point of this section, as a result of which there is obtained the advantage that the previously cut sods are broken up and partly turned over.

The arm which connects the tool to the tool shaft, may be so shaped, that at the moment at which the tool comes into contact with the soil its curved portion is directed towards the latter as is shown in Fig. 1. In this figure the arm 5 is slightly curved, the arm 5' considerably curved and the arm 5" is a straight line but not radially. The latter arm extends tangentially to an imaginary circle concentric with the tool shaft. These three different shapes of tool arms, shown by way of example in Fig. 1, all present the advantage of automatically freeing these arms of grass, straw, manure and so forth as these constituents are inclined to slide along the cutting edge of the arms outwardly. They however have the disadvantage that they strike upon the soil and must force it apart before the cutting tool has cut away the soil, that is to say when the soil is still solid and hard, which involves an unnecessary consumption of power.

Figure 5:
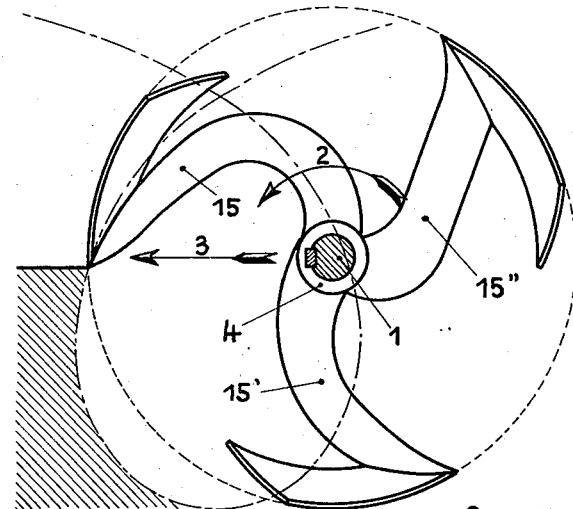
Fig. 5 shows a modified form of construction of the tool according to Fig. 1, in which the arm which connects the tool to the shaft is curved in the reverse manner.

It is however possible to connect the tools to the tool shaft by means of arms which at the moment at which the tools meet the soil are bent upwardly as is shown in Fig. 5. In this figure the arms 15, 15' and 15" exhibit a more or less pronounced curvature. The arm 15 is provided with a back of which the periphery corresponds approximately with the cycloid which the point 6 of the tool is about to describe. It will be understood that this arm can penetrate the soil with ease and without particular consumption of power as it only has to enlarge the gap which has already been cut by the tool. However it is not freed automatically from the grass and straw particles located in its path.

Figure 7:
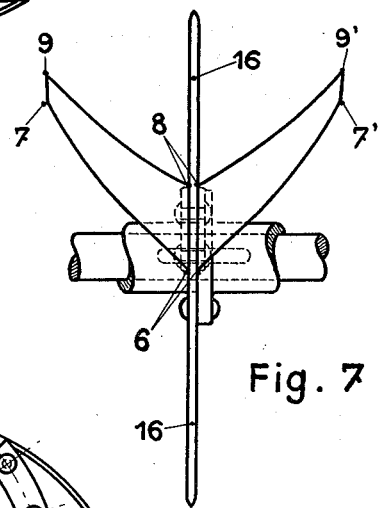
Figs. 6 and 7 show in elevation and front view a further form of construction in which the tools are secured to a disc driven by the shaft of the machine.
Figure 6:
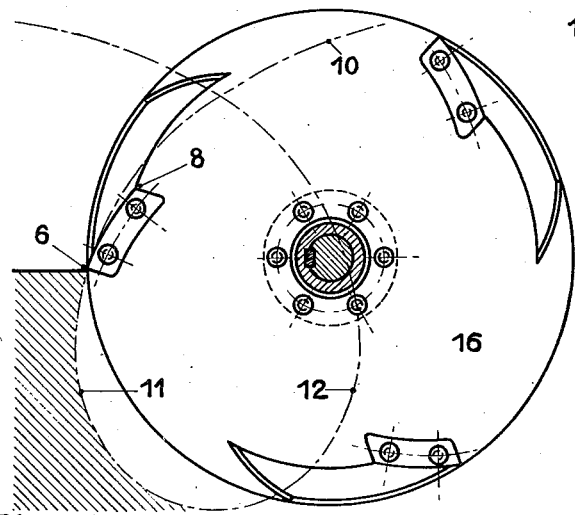

Finally the tools can be secured to the tool shaft by means of a disc as is shown in Figs. 6 and 7. In this case the triangular tool is divided, by the disc 6 which passes through the edge 6—8, into two symmetrical halves as will be seen from Fig. 7 showing an edge elevation of the disc. The tools may be welded or riveted to the disc, as shown in the drawings. In Fig. 6 it will be seen that the cutting periphery of the disc passes through the attacking point 6 of the triangular tool. It is true that the disc is freed from grass and straw particles located in its path but it has to split the soil before the passage of the tool which renders necessary a predetermined additional consumption of power.

The soil which is solid and is mainly shown in Fig. 3 by shading, only constitutes a diagrammatic illustration. Actually the soil is cut by each tool in the manner of saw teeth or more accurately stated along two intersecting curved surfaces. These cutting surfaces are the most prominent on the surface of the soil and are gradually reduced in depth until they disappear and coincide with a cylindrical surface underneath the tool shaft as shown in Fig. 8. The projecting points of the cutting points 17, 17' and 17" on the surface of the soil correspond with the attacking points of the points 6 of the triangular tools. The points 18, 18' and 18" on the contrary correspond with the attacking points of the outer ends 7, 7' of the wings of each tool. The points 18 are located in front of the points 17 which determine the saw tooth-like cutting shape, as the soil is attacked somewhat later by the ends 7, 7' than by the centrally located point 6, after the tool shaft has continued to turn over through a predetermined angle and has consequently moved over towards the left in the direction of the arrow 3 in Fig. 1.

This form of cutting of the solid soil by the curved intersecting surfaces is of advantage as it enables the downwardly curved arms 5, 5' of the tools in Fig. 1 or the disc in Fig. 6, to cut firstly the edge 19, 19' of the cut surfaces in Fig. 8 instead of a wall of the solid soil. The force necessary for causing the arm or the disc to penetrate this edge is less than for penetrating into a continuous wall of solid soil, as on both sides of the arm or of the disc the inclined surfaces meeting in the edge are not supported by the adjacent solid soil and consequently can spread apart and break up more easily.

In order, for this purpose, to increase the projection of the edges 19, 19' in question, provision may be made that the cutting edge of the triangular tool is no longer contained within a cylinder of which the axis is the axis of rotation of the tool, as shown in Figs. 1 to 6, but the radius of the cutting edge of the tool may be increased relatively to the tool shaft from the centre 6 towards both ends 7, 7'. A tool of this character is shown in side elevation in Fig. 9 and in plan in Fig. 10. In these figures it will be seen that the central attacking point 20 of the triangle has a smaller radius of rotation about the shaft 1 than the ends 21, 21' of the cutting edge of the tool. The inclination of the cut surfaces cut in the soil is in this case larger than the triangle, determined by the points 21, 20, 21 shown in Fig. 10, as the ends 21, 21' only engage with the soil after the point 21 and after the shaft 1 has turned through a predetermined angle and has advanced a predetermined distance in the direction of the arrow 3. These cut surfaces will also possess below the tool shaft a cross section corresponding with the triangle 21', 20, 21. The arm or the disc to which the tool is secured may then provide for themselves a track without difficulties by the edge of the cut surfaces. The tool 20, 21, 22 in Figs. 9 and 10 is naturally pressed and twisted according to the cycloids of each attacking point of the cutting edges 20—21 and 20—21', but with the difference that in this case the radii of curvature of the cycloids gradually increase from the point 20 to the points 21 and 21', whereas in the tool in Fig. 1 the cycloids all have the same radius of curvature along the cutting edge and only their inclination is different.

In Fig. 10 the twisting of the tool blade is shown particularly clearly.

When the tool is to operate in very hard stony soil it may arise that the pressure of the tool forwardly is strong enough to allow of a slight slip of the driving wheels forwardly. In this case the extended cycloid described by each tool no longer corresponds with the theoretical cycloid prescribed as it corresponds with a linear forward speed of the machine which is greater than that prescribed and which is indicated in the above mentioned figures by the arrow 3. The actual cycloid is then more pronounced and more pointed downwardly than that prescribed theoretically. The result of this is that the tool strikes with its back on the soil. It then only operates under unfavourable conditions. In order to obviate this danger it is sufficient to additionally incline rearwardly the part of the arc of curvature, according to which the tool is twisted, along the cutting edge from the point to the extreme and whilst maintaining the angle constant.

In other words it is sufficient to twist the tool according to a cycloid which is calculated with a somewhat faster linear forward movement than the forward movement which actually takes place. When in fact the actual forward speed of the machine does not exceed the theoretical forward speed or even remains less, the sole consequence of this is that the tool penetrates the soil with a more or less pronounced cutting action. The disadvantage is very slight and is less important than when the tool when penetrating the soil impacts on the latter with the back thereof.

As will be seen from Figs. 1 to 6, the double cutting edge of the tool or the attacking edge, from the point to the outer end of the wings, is contained within a circle described by the point around the tool shaft so that during idle running the machine can move over the soil without substantial vibrations.

Figure 11:
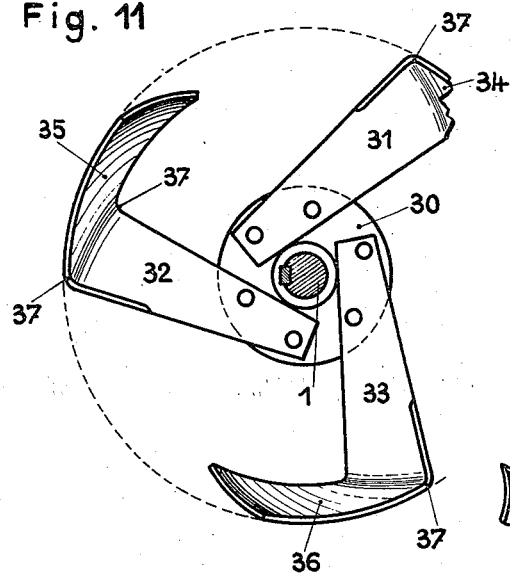
Fig. 11 is a side elevation of a tool consisting of two symmetrical parts and which are formed integral with their support.

According to Fig. 11 there is keyed to the shaft 1 a hub 30 to which the tool carriers are secured in any suitable manner, for example by bolting or riveting. These carriers 31, 32, 33 are formed by arms of sheet metal steel which are cut and pressed integrally with the tools 34, 35, 36 and which have the particular shape described above. Each tool is connected to its carrier by a curved part 37 which imparts considerable rigidity to the whole. From the drawings it will be seen that with this arrangement the cutting edges of the tools are contained in a cylinder of which the axis coincides with that of the shaft 1. It will also be seen that for example the tool part 33—36 completely covers the opposite corresponding symmetrical part.

Figure 12:
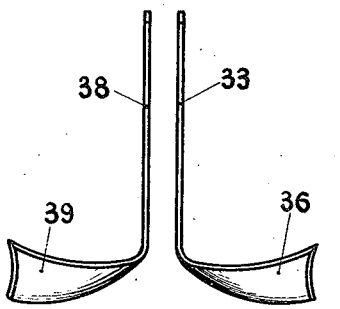
Fig. 12 shows in elevation the two parts of a tool looking from the left hand side of Fig. 11.
Figure 13:
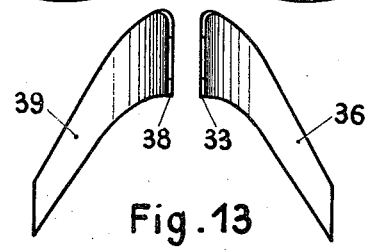
Fig. 13 shows the two parts of the tool in plan.

In the elevation in Fig. 12 there will be seen in addition to the part 33—36 also the other opposite part 38, 39. The tool carriers 32, 33 are shown at a predetermined distance apart as though they were secured to opposite sides of the hub 30. They may, however, also touch one another and be secured to the same side of the hub 30 or they may be connected together, for example bolted or riveted, so together to form a single tool. In Fig. 13 these same tools are shown in plan.

Figure 14:
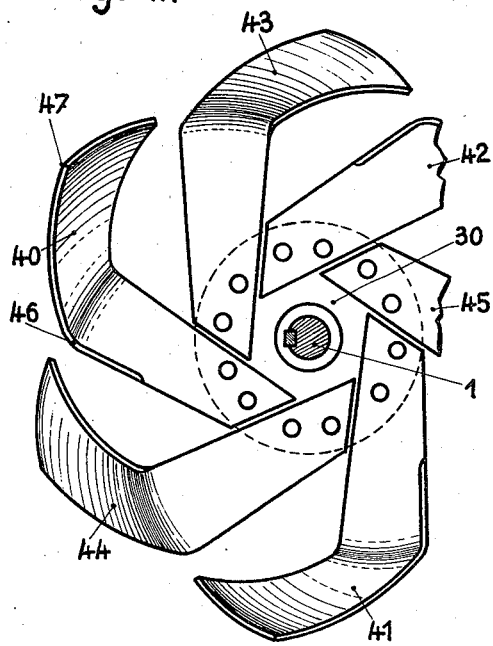
Fig. 14 is a side elevation of another form of construction.

In Fig. 14 the tools are relatively displaced. The three tools 40, 41, 42 are bent forwardly and the three others 43, 44, 45 rearwardly. This is shown separately in Fig. 15 which is an elevation of the arrangement shown in Fig. 14 looking from the left. All these tools have in plan substantially the same shape as those shown in Fig. 13. All have a cutting edge with an increasing radius relatively to the shaft 1, from the front part 46 (which constitutes the theoretical point of the triangle formed by the two parts of the tool) up to the rear end 47.

Figure 16:
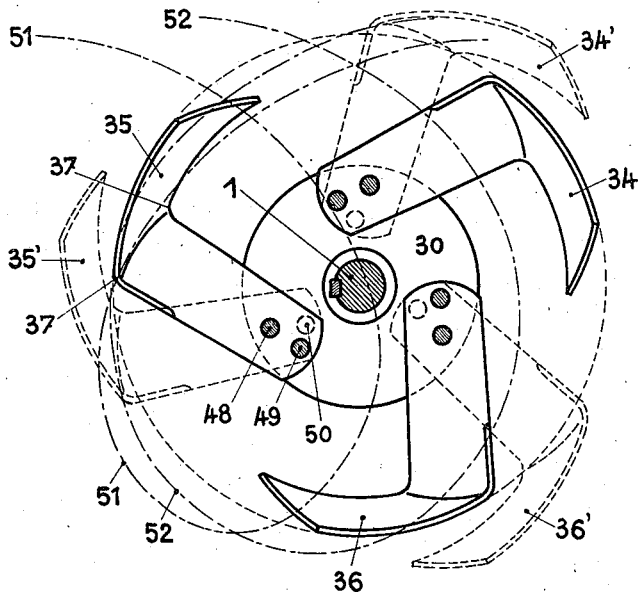
Fig. 16 is a side elevation of an adjustable arrangement of the tools.

Fig. 16 shows a similar arrangement of similar tools. In this case however each tool carrier 31, 32, 33 is so secured by two bolts 48, 49, to the hub 30, that when removing the bolt 49 the tool can rock about the bolt 48 so as to be brought into another operative position which is determined by the hole 50, provided for this purpose in the hub through which the bolt 49 can be passed.

In the first operative position, shown in full lines in the drawings and which is determined by the bolts 48, 49, the twisted cycloid surface of the tool corresponds with the cycloid 51, 51, 51, which is indicated in chain-dotted lines. This will be seen from the curvature 37, 37 which has only a small cutting angle relatively to the above mentioned cycloid. This cycloid corresponds with the comparatively high forward speed relatively to the speed of rotation of the tool. When however it is desired to work the soil to a greater depth and therefore to reduce the linear forward speed whilst the speed of rotation of the tool remains constant, there is obtained quite a different cycloid which is also indicated by chain-dotted lines at 52, 52, 52. This curve corresponds with the path described in space by the attacking point (or more correctly by the curvature 37) of the tool. The bolt 49 is then placed in the hole 50 and the tool assumes the position 35' indicated in broken lines. It will be seen that when the cycloid of the tool (for example from the point 37—37 of the bent portion between the tool and the tool carrier) then again corresponds very closely with the new cycloid 52—52. By this arrangement with two different inclinations of the tool carriers, which can be obtained in any suitable manner, it is possible to operate with two forward speeds which are very different from one another, under favourable conditions for cutting the soil.

Figure 15:
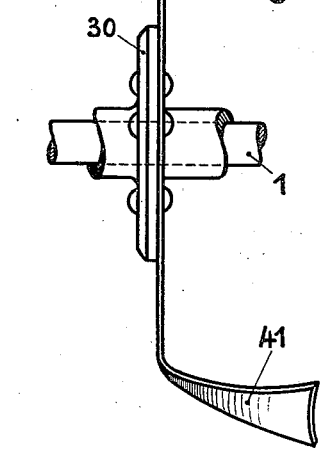
Fig. 15 is an elevation thereof.
Figure 17:
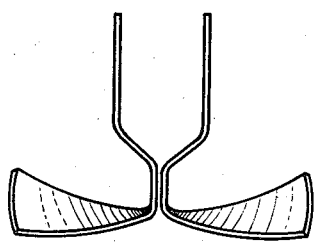
Figs. 17 to 21 show separate forms of construction of the tools.
Figure 18:
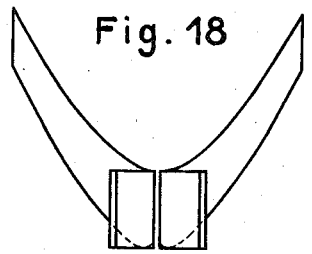
Figure 19:
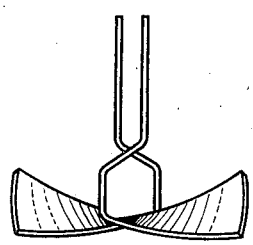

Fig. 17 shows in elevation, Fig. 18 in plan and Fig. 19 in elevation different forms of construction of the tool carriers, which will be readily understood and which have the advantage to distribute the strains of the tool during cutting more effectively to the tool carrier of sheet steel and stress this less to distortion than when it is constructed according to Figs. 12 and 15.

Figure 20:
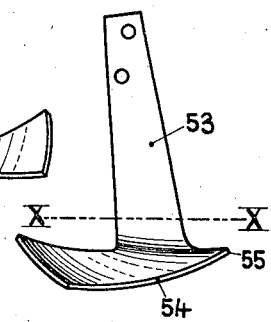
Figure 21:
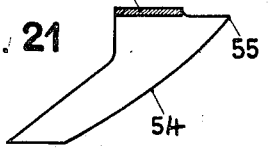

Fig. 20 shows in elevation and Fig. 21 in plan section on the line X—X of Fig. 20) a further form of construction of a tool according to Fig. 11. In this case the tool carrier 53 is displaced somewhat rearwardly relatively to the cutting edge 54 so as to cause the point 55 of the blade to project somewhat. This point 54 engages more easily with hard soil than the curved portion 37 of the tool 32—35 in Fig. 11. It will be understood that this rearwardly displaced tool holder according to Figs. 20 and 21 may be combined with the construction in Figs. 17, 18 and 19.

I claim:

1. A tool for a motor cultivating machine having a horizontal shaft arranged parallel to the axis of the driving wheels of said machine, said tool being formed of two blades, said blades having rearwardly inclined cutting edges extending to opposite sides of a plane at right angles to the shaft and defining the center of the tool thereby to substantially form a triangle of which the apex is directed in the direction of rotation of said shaft, said blades being so twisted symmetrically on opposite sides of the apex that the tool first penetrates with its lowest point at the apex and any cut carried out by the tool at right angles to the axis of rotation of the horizontal shaft corresponds at least approximately to the arc of an extended cycloid described by the cutting edge of the tool at a selected point of the cycloid, this point being located for example, at about 10 to 15 cm. below the surface of the soil.

2. A tool according to claim 1, wherein the blades in addition to being twisted are also pressed symmetrically along a curve so that the cutting surface in a plane at right angles to the axis of the horizontal shaft coincides with extended cycloids described by the cutting edge in this plane at the said selected point.

3. A tool according to claim 1, wherein the twisting and pressing of the blades is calculated so as to correspond with a somewhat larger linear forward movement of the machine than is actually the case, whereby the tool acquires a slight constant additional inclination rearwardly from the apex, whereby the tool is prevented from striking upon the soil with the back thereof.

4. A tool according to claim 1, wherein the double cutting edge of the tool from the apex to the outer ends of the blades, is contained in a circle described by the apex about the axis of the horizontal shaft, whereby the machine when idling can roll on the soil without substantial vibrations.

5. A tool according to claim 1, comprising a pair of symmetrical parts, a carrier formed integral with each of said parts, a hub keyed to said horizontal shaft, said carrier being secured to said hub.

6. A tool according to claim 1, comprising a pair of symmetrical parts, a carrier formed integral with each of said parts, a hub keyed to said horizontal shaft, said carrier being secured to said hub, said tool and said carrier being connected together by a curved surface.

7. A tool according to claim 1, comprising a pair of symmetrical parts, a carrier formed integral with each of said parts, a hub keyed to said horizontal shaft, said carrier being secured to said hub, said carrier being bent in proximity to the tool so as to increase the resistance to torsion of said tool.

8. In a motor cultivating machine having a horizontal shaft arranged parallel to the axis of the driving wheels on said cultivating machine, a plurality of tools each of said tools being formed of blades arranged to substantially form a triangle, the blades being twisted symmetrically on opposite sides of the apex so as to form a cutting surface which corresponds at least approximately to the arc of an extended cycloid described by the cutting edge in a plane passing at right angles to the axis of the horizontal shaft at a point which is about 10–15 cm. below the point at which the cutting edge enters the soil, a hub secured to said horizontal shaft, carriers formed integral one with each of said blades, said carriers being secured on opposite sides of said hub, one opposite to the other.

9. In a motor cultivating machine having a horizontal shaft arranged parallel to the axis of the driving wheels on said cultivating machine, a plurality of tools, each of said tools being formed of blades arranged to substantially form a triangle, the blades being twisted symmetrically on opposite sides of the apex so as to form a cutting surface which corresponds at least approximately to the arc of an extended cycloid described by the cutting edge in a plane passing at right angles to the axis of the horizontal shaft at a point which is about 10–15 cm. below the point at which the cutting edge enters the soil, a hub secured to said horizontal shaft, carriers formed integral one with each of said blades, said carriers being secured relatively displaced to said hub and on opposite sides of said hub, so that the parts first engaging the soil of the tool disposed on one side of the said hub overlaps the corresponding parts of the tools on the other side of the hub.

10. In a cultivating machine according to claim 1 wherein tools of the character specified are connected to said horizontal shaft by arms which are curved in a direction towards the direction of rotation of said shaft.

11. In a cultivating machine according to claim 1, wherein tools of the character specified are connected to said horizontal shaft by arms extending along a straight line tangential to an imaginary circle concentric with said shaft.

12. A tool for motor cultivating machines including a horizontal shaft arranged parallel to the axis of the driving wheels of said machine, said tool including a support secured to said shaft and a blade extending laterally from the support and having a rearwardly extending arcuate cutting edge, said blade being twisted transversely from its cutting edge in an inward direction so that every part of the blade behind its cutting edge passes through the cut made by its cutting edge during approximately the first 90° of its movement through the soil.

LÉON DUFOUR.